United States Patent Office 2,701,780
Patented Feb. 8, 1955

2,701,780

CURING SYNTHETIC DRYING OILS

Joseph F. Nelson, Rahway, John F. McKay, Jr., Cranford, Lester M. Welch, Madison, and Donald F. Koenecke, Elizabeth, N. J., assignors to Standard Oil Development Company, a corporation of Delaware No Drawing. Application October 22, 1951,
Serial No. 252,585

2 Claims. (Cl. 154—43)

This invention relates to a method for curing synthetic drying oils prepared by polymerizing butadiene-styrene mixtures. A more particular aspect of the invention relates to the use of cured films of such drying oils as metal adhesives, insulating materials and the like.

There is an urgent need in industry today for a metal cement which can be applied readily and can be cured rapidly to give a bond with a high degree of tensile strength and chemical resistance. Ideally, the cement should be capable of uniting dissimilar metals such as aluminum to brass, since such bonds are impossible to make with solder or welds. The need for an organic metal cement is particularly pressing at the present time because of the impending shortage of tin used in solder. Industry, for instance, is actively seeking an organic cement which can be used for closing the side seams of cans which are normally soldered. In such applications, the cement must be capable of being applied hot to grooves along the sides of the can blanks which are then formed, crimped, bumped, and the cement cured by heat. The cement after baking must not be brittle since the ends of the can cylinders must be flared before the application of the can tops and bottoms, but should have a high tensile strength because pressure is frequently developed during processing of the can contents (e. g., canned beer). Furthermore, the cement should not contain solvents, should be non-toxic, and should be chemically resistant to the can contents. Furthermore, there is an urgent need in the electronics field for an electrical insulating material which can be rapidly coated on copper wires and electrical fittings to give a hard, tough, adherent chemical resistant surface coating. None of the varnishes available today are completely satisfactory for either of these uses because they lack one or more of the above desirable qualities. Application difficulties and/or low melting points militate against the use of plastic materials for insulating purposes even when they have the requisite high electrical resistivity.

It has now been discovered that oily copolymers of butadiene and styrene are particularly suited for producing a strong bond between different metals. Tinplate, black iron, stainless steel, copper, brass or aluminum can be strongly cemented to like or dissimilar metals by the product of this invention. Aluminum can be sealed to brass or steel, steel to brass, etc., operations which are difficult or impossible to perform with existing metal solders. Furthermore, a strong metal to glass seal can also be made with this copolymer. The applicability of this invention to wide industrial use is apparent, but it is particularly adapted to can fabrication operations in that a tough, resistant can side seam can now be made with a minimum of changes in existing can manufacturing techniques. The results are unexpected and novel because the technique of curing the cement according to this invention does not involve oxidation effects—normally considered necessary to cure the copolymer when it is used as a surface coating—but involves only irreversible polymerization of the copolymer bond.

In brief, this invention consists in coating the metal to be bonded with a thin layer of 100% non-volatile matter oily copolymer of butadiene and styrene. The copolymer should be of low viscosity so that it may be applied hot as a thin liquid from a suitable storage tank in large industrial operations. For other than production line application, a low viscosity copolymer is desirable so that an even coating can be easily applied cold to the metal to be bonded. Contact of the copolymer coated metal with the metal (or glass) to be cemented is then made and heat is applied to effect the curing. It is convenient in the laboratory to apply heat to test panels by means of a small press with electrically heated platens, but cures can also be effected commercially by such means as impinged flames or electronically by induction heating. It should be noted that, since the copolymer is cured between metal, oxygen is not available to take part in the curing mechanism. The time of cure of the copolymer to a strong metal bond is a function of the curing temperature. At 550° F., a 5 mil copolymer layer between metal cures to a strong bond in 3 minutes, at 650° F. in 30 seconds, and at 800° F. in less than 10 seconds. At flame temperatures cures should occur in 1 to 3 seconds or less.

These copolymers can also be baked onto copper in the presence of air at high temperatures to produce a surface coating which has excellent electrical insulating properties.

Accordingly, therefore, this invention is broadly concerned with the curing of the oily copolymers of butadiene and styrene by heating at very high temperatures for very short times. The temperatures may vary from 550° F. up to flame temperatures which may be as high as 5000° F., while the time of cure may vary from three minutes to one second or less, the longer time being necessary for the lower temperatures, the time becoming shorter as the temperature increases. The curing may take place either in the presence or absence of air since the curing appears to be due to polymerization rather than oxidation as occurs at lower temperatures employed in heat bodying. The films to be cured may be placed between metals of various types and the curing accomplished to realize a firm bond between the metals. The film also may be simply coated on the surface of a metal such as copper and cured to produce a highly effective insulatory material.

For the purposes of this invention it is particularly desirable to use drying oils which have been obtained by copolymerizating 60 to 90 parts of butadiene-1,3 with 40 to 10 parts of styrene, preferably about 75 to 85 parts of the former and 25 to 15 parts of the latter, the polymerization being carried out at 20 to 100° C., preferably below the melting point of the catalyst or between 35° and 90° C., in a reaction diluent. Temperatures near the lower end of the range set forth are generally more suitable for batch polymerizations and temperatures nearer the upper end of the range are particularly suited for continuous operation. As a polymerization catalyst about 1.0 to 5 parts, preferably about 1 to 3 parts of a finely dispersed metallic sodium catalyst is used in the optional presence of various polymerization modifiers which tend to promote the reaction and produce colorless products of more exactly reproducible drying rates. As reaction diluent it is desirable to use, for example, a naphtha having a boiling range between about 90 and 120° C. or straight run mineral spirits such as Varsol (boiling range 150 to 200° C.) inert hydrocarbon diluents such as pentane, xylene, benzene, toluene, cyclohexane, or the like, individually or in admixture with each other. To be suitable for the polymerization reaction here involved, the diluents should have a boiling range within the limits of about −15° C. and 200° C. The diluents are usually used in amounts ranging from 50 to 500, preferably 200 to 300 parts per 100 parts of monomers.

Instead of using inert diluents, it is also possible to use modifying diluents such as butene-2 or other low boiling olefins which modify the reaction by limited copolymerization and chain termination. Various ethers having more than two carbon atoms per molecule such as diethyl ether, diisopropyl ether, dioxane, vinyl ethyl ether, vinyl isopropyl, vinyl isobutyl ether, anisole, phenetole and other ethers of various types are also useful as co-diluents to insure formation of colorless products when used in amounts ranging from about 10 to 35 parts per 100 parts of monomer together with the aforesaid amount of inert diluent such as solvent naphtha. p-Dioxane and its various methyl and ethyl homologues is particularly preferred in batch polymerization, but diethyl ether is very good in continuous polymerization. In selecting the ether co-diluent, it is especially desirable to select an ether having a boiling point at least 10° C. below the lower limit of the boiling range of the hydrocarbon diluent and thus when using Varsol, ether co-diluents boiling between about 25 and 140° C. are preferred in order to permit its ready recovery from the polymerized reaction mixture.

Other means of modifying the properties of the polymer product involve the substitution of all or at least part of the butadiene feed with other diolefins such as isoprene, 2,3-dimethyl butadiene-1,3, piperylene or 2-methyl pentadiene-1,3. Likewise, styrene may be replaced by its various ring-alkylated homologues such as the various methyl styrenes, dimethyl styrenes, ethyl styrenes, or diethyl styrenes. In particular, it is desirable in batch polymerizations to add the styrene monomer to the reaction mixture only after the polymerization of the butadiene has been initiated. By this expedient, the induction period is quite substantially reduced, and the polymer produced is gel-free and of desirably low viscosity as opposed to a more viscous product obtained when the styrene monomer is present in the reaction mixture from the beginning.

Especially where a coarse dispersion of sodium is used as catalyst, it is also advantageous to use about 1 to 50%, preferably 10 to 20% based on sodium of a $C_1$ to $C_5$ aliphatic alcohol. Secondary and tertiary alcohols, particularly isopropanol or tertiary butanol are preferred. Such alcohols act as polymerization promoters and depending on the degree of catalyst dispersion have a more or less pronounced effect on the intrinsic viscosity of the resulting product. The reaction time and induction period also vary, depending on the degree of catalyst dispersion and reaction temperature, the reaction time ranging from about 40 hours with a coarst catalyst at about 50° C. to about 15 minutes at about 100° C. with a catalyst particle size of less than 100 microns diameter. While sodium is preferred, similar catalysts such as potassium, sodium hydride, and various alloys of sodium are also useful. Agitation of the reaction mixture during synthesis increases the efficiency of the catalyst. Conversions of 50 to 100% on monomers can be accomplished fairly readily in batch-type as well as in continuous polymerizations, although the catalyst requirements are greater for continuous operation than for a batch operation of equal conversion.

Destruction of catalyst at the end of the reaction is effectively accomplished by adding to the reactor a moderate excess of alcohol, e. g. 100% excess of isopropanol based on sodium, and agitating at the reaction temperature for another half hour or so. After destruction of the residual sodium by alcohol, the crude product containing the alcoholate, excess alcohol and other solid impurities is cooled, neutralized with dry carbon dioxide, glacial acetic acid or other preferably anhydrous acid which does not affect the polymer and the neutralized product is then filtered with a filter aid such as silica gel, clay, charcoal or its equivalent. Acetic acid may be used without alcohol.

In the preferred modification the clear, colorless filtrate is then fractionally distilled to remove first the alcohol-hydrocarbon azeotropes and then the dioxane-hydrocarbon azeotropes. Finally, for use as a cement, it is desirable to distill off the additional hydrocarbon until a product containing about 100% non-volatile matter is obtained, the non-volatile matter being the polymeric drying oil. The resulting product is a clear, colorless polymeric composition having a viscosity between about 0.5 and 20 poises at 50% non-volatile matter in Varsol. If desired, the product viscosity can be readily increased within or above these limits by heat bodying at temperatures between 200 and 300° C., e. g. at 220 to 260° C. Where higher viscosity polymers are desired for application as metal adhesives, it is desirable to retain sufficient solvent in the polymer to maintain a working viscosity. Upon evaporation of solvent from the polymer solution on the metal object, a high viscosity polymer suitable for curing is obtained.

The following experiments are presented as specific illustrations of the present invention without any intention of limiting it thereby:

EXAMPLE 1

A butadiene-styrene drying oil was prepared from the following charge:

|  | Parts |
|---|---|
| Butadiene-1,3 | 80 |
| Styrene | 20 |
| Varsol * | 200 |
| Dioxane | 30 |
| Isopropanol | 0.25 |
| Sodium ** | 1.5 |

* Straight run mineral spirits; API gravity, 49.0; flash, 105° F.; boiling range, 150 to 200° C.; solvent power, 33–37 kauri-butanol value (reference scale: Benzene—100 K. B. value, n-heptane 25.4 K. B. value).
** Dispersed to a particle size of 10 to 50 microns by means of an Eppenbach Homo-Mixer.

The polymerization of this charge was carried at 50° C. in a 2-liter autoclave provided with a mechanical agitator. Complete conversion was obtained in 8 hours. The catalyst was destroyed and removed from the resulting crude product and the product was finished to contain 100% non-volatile matter as described in earlier parts of this specification. The resulting product had a viscosity of 0.75 poise at 50% concentration in Varsol.

EXAMPLE 2

Strips of various metals were cemented with 5 mil thick films of the oily copolymer of Example 1. The tensile strengths of the bonds were determined by pulling the metal strips apart longitudinally in a Tinius-Olsen tensile tester. The following data were obtained:

Table I

TYPICAL TENSILE STRENGTHS OF METAL TO METAL BONDS MADE BY BUTADIENE-STYRENE COPOLYMER[1] CEMENT

| Metals Bonded [2] | Curing Schedule [3] | Tensile Strength, Lbs./Sq. In. [4] |
|---|---|---|
| Tinplate to Tinplate | 3' at 650° F | 332 |
| Do | 2' at 650° F | 400 |
| Do | 1' at 650° F | 120 |
| Do | 30" at 650° F | 45 |
| Do | 5' at 550° F | 133 |
| Do | 3' at 550° F | % |
| Stainless Steel to Stainless Steel | 2' at 650° F | 1,400 |
| Copper to Copper | do | 355 |
| Aluminum to Aluminum | do | 180 |
| Do | 3' at 650° F | 950 |
| Brass to Brass | 2' at 650° F | 390 |
| Black Iron to Black Iron | do | 475 |
| Aluminum to Stainless Steel | do | 110 |
| Aluminum to Copper | do | 310 |
| Stainless Steel to Brass | do | 400 |

[1] 100% non-volatile matter. Viscosity at 50% NVM (Varsol diluent) = 0.75 poise.
[2] 1" x 3" test panels bonded with 5 mil thickness of copolymer.
[3] Cured between platens of electrically heated laboratory press—negligible pressure.
[4] Measured on Tinius-Olsen tester by pulling test strips apart longitudinally.

The above data illustrate the fact that the metal to metal bonds obtained by the cement of this invention have a remarkably high tensile strength. However, those bonds with the highest tensile strength may tend to be too brittle for some uses due to the resin-like nature of the cured cement. For applications where greater flexibility of the bonding cement is a prerequisite, the shorter cure and/or lower temperature of curing will produce a more flexible type of cured oil which still displays good tensile strength.

EXAMPLE 3

A series of tinplate panels were cemented together with the oily copolymer obtained according to the process of Example 1 and placed in sealed jars containing various materials which might affect the bond. The jars were then stored at 130° F. for seven days, after which the cemented panels were subjected to the same test for tensile strength used in Example 2. The following results were obtained:

Table II
CHEMICAL RESISTANCE OF BUTADIENE-STYRENE OILY COPOLYMER [1] METAL TO METAL [2] BONDS

| Solvent [3] | Curing Schedule [4] | Tensile Strength, Lbs/Sq. In.[5] |
|---|---|---|
| None [6] | 5' at 550° F | 133 |
| Motor Oil | do | 144 |
| Ethylene Glycol | do | 120 |
| Animal Fat | do | 106 |
| Metal Polish | do | 138 |
| Steam [7] | do | 113 |
| None [6] | 3' at 650° F | 332 |
| Motor Oil | do | 385 |
| Ethyl Alcohol | do | 475 |
| Ethylene Glycol | do | 420 |
| Animal Fat | do | 480 |

[1] 100% non-volatile matter. Vis. at 50% NVM (Varsol diluent) = 0.75 poise.
[2] Tinplate to tinplate.
[3] Test panels in contact 7 days at 130° F.
[4] Cured between platens of electrically heated laboratory press—negligible pressure.
[5] Measured on Tinius-Olsen tester.
[6] Average of 3 values. Reproducibility = ±45 pounds.
[7] 90 minutes at 15 pounds steam pressure (250° F.).

The above data show that the tensile strength of the cured cement is little affected by steam or common solvents and that the cement is suitable for sealing tin cans which are to be used as containers for such things as motor oil, antifreeze, polish, etc.

EXAMPLE 4

Thin films (about 1.0 to 2.0 mils) of the oily copolymer obtained according to Example 1 were coated on 4" x 4" x 0.030" copper test plates and cured by baking at 650° F. in air for two minutes. The films produced were very hard, amber in color, had excellent adhesion to the test plates and did not crack or chip when the test plates were given snap bends. The electrical resistance was measured by a method closely approximating the ASTM insulation resistance test in a standard Leeds and Northrup Insulation Tester and compared with a copper panel coated with a commercial insulating varnish. This control varnish was cured by baking 30 minutes at 300° F. The following results were obtained and compared with the electrical resistance on a variety of plastics as reported in the literature:

Table III
ELECTRICAL RESISTANCE [1] OF CERTAIN MATERIALS
(Typical Data)

| Material | Resistivity ohms per cm.[3][4] |
|---|---|
| Copolymer Butadiene-Styrene [2] | $1.58 \times 10^{15}$ |
| Commercial Insulating Varnish [3] | $1.08 \times 10^{12}$ |

(Data below taken from Handbook of Chemistry, 6th Edition)

| | |
|---|---|
| High Impact Phenolic Molding Resin | $0.5-1.0 \times 10^{11}$ |
| Cellulose Acetate | $0.5-1.0 \times 10^{13}$ |
| Urea | $1.0-2.0 \times 10^{14}$ |
| Phenolic, Low Loss | $0.5-1.0 \times 10^{15}$ |
| Vinyl (No Filler) | $0.5-1.0 \times 10^{15}$ |

[1] Measured on Leeds and Northrup insulation tester.
[2] 0.75 poise viscosity at 50% NVM (Varsol diluent). 1.7 mil film cured on copper plate by baking 2 minutes at 650° F. in presence of air.
[3] 0.9 mil film cured on copper plate by baking 30 minutes at 300° F.
[4] High value is desirable. Measured at room temperature.

The above data clearly demonstrates the superior electrical resistance properties of the insulating material of this invention. These good electrical properties combined with good metal adhesion make this a very useful material in the fabrication of electronic articles.

The nature of the present invention having been thus fully set forth and specific examples of the same given, what is claimed as new and useful and desired to be secured by Letters Patent is:

1. The method of curing oily copolymers of butadiene and styrene which comprises heating a film of said oily copolymer at a temperature of 550° to 5000° F. for from three minutes to less than one second in the absence of air, said copolymer having been prepared by copolymerizing 75 to 85% butadiene-1,3 and 25 to 15% styrene in the presence of sodium as a catalyst at a temperature between 20° and 100° C.

2. A structure comprising two metal layers having an adhesive film therebetween comprising a hard, resinous product obtained by heating an oily copolymer of butadiene and styrene to a temperature between 550° and 5000° F. for from three minutes to less than 1 second, in the absence of air, said copolymer having been prepared by copolymerizing 75 to 85% butadiene-1,3 and 25 to 15% styrene in the presence of sodium as a catalyst at a temperature between 20° and 100° C.

References Cited in the file of this patent
UNITED STATES PATENTS

| | | |
|---|---|---|
| 2,237,623 | Ledwinka | Apr. 8, 1941 |
| 2,252,333 | Rothrock | Aug. 12, 1941 |
| 2,264,811 | Rothrock | Dec. 2, 1941 |
| 2,317,858 | Soday | Apr. 27, 1943 |
| 2,473,538 | McIntire | June 21, 1949 |
| 2,484,705 | Gray | Oct. 11, 1949 |

FOREIGN PATENTS

| | | |
|---|---|---|
| 676,508 | France | Nov. 28, 1929 |

OTHER REFERENCES

"Rubber to Metal Bonding" by S. Buchan, pub. 1948 by Crosby, Cockwood & Son, London, pp. 88 and 89.